Sept. 20, 1966   N. R. BORCH ET AL   3,273,557
VACUUM FURNACE WINDOW
Filed Jan. 12, 1965
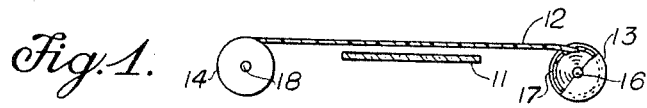
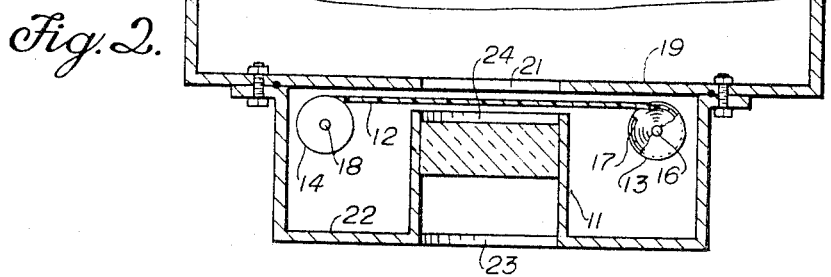
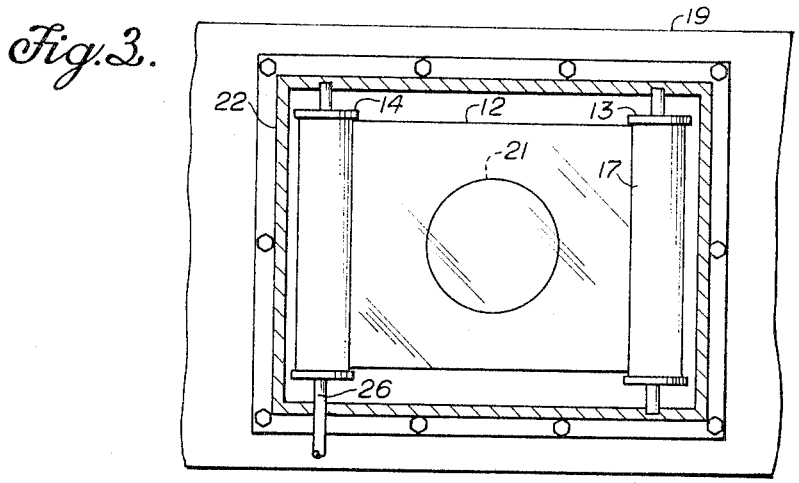
INVENTORS
NIELS R. BORCH
ROBERT S. JUNTZ
BY
ATTORNEY 3,273,557
VACUUM FURNACE WINDOW
Niels R. Borch, Livermore, and Robert S. Juntz, Hayward, Calif., assignors to the United States of America as represented by the United States Atomic Energy Commission
Filed Jan. 12, 1965, Ser. No. 425,094
7 Claims. (Cl. 126—200)

The invention described herein was made in the course of, or under, Contract W-7405-ENK-48 with the United States Atomic Energy Commission.

The present invention relates to viewing windows and more particularly to apparatus adapted to use with viewing windows to prevent the collection of foreign substances thereon.

Viewing windows frequently lose their transparency to light by matter impinging upon and adhering to the surface thereof. "Light" as used herein refers to electromagnetic radiation in the infra-red visible or ultra-violet frequency range unless preceded by a more limiting word. Similarly, "transparency" is defined as being pervious to "light" unless preceded by a more limiting word. Although an unobstructed light path through the windows can, in some instances, be maintained by frequent cleaning, oftentimes the matter impinging upon the windows mars the window surface thereby necessitating replacement of the window. In any case, the required frequent cleaning is inconvenient. The problem has heretofore been somewhat alleviated by the installation of window wipers. However, matter adhering to the window surface is not always sufficiently removed to maintain a satisfactory light path through the window. Furthermore, since the matter is allowed to impinge on the window surface, the windows are still susceptible to marring.

An alternate solution to problems evolving out of light transmission interfering matter collecting on viewing windows causing them to loose their transparency has been adopted heretofore in vacuum furnaces. In such devices, a rotatably mounted apertured disc is disposed interiorally and adjacent to vacuum furnace viewing windows, which apertured disc advances to expose to the furnace interior only a small portion of the window at a time. This apertured disc maintains a clear light path through the window for a time; however, the window is still exposed to impingement and adherence of interfering matter and must eventually be cleaned or replaced. Furthermore, for a given size viewing path, the furnace's viewing window must be considerably larger than required for a single viewing path to provide the additional window increments exposed by the apertured disc.

The chief feature of the present invention is the use of a transparent sheet which is moved by a suitable transport mechanism past the surface of the viewing window to intercept impringing interfering matter. The window is thereby protected and an unobstructed light path through the window itself is maintained indefinitely.

As noted hereinbefore, in the prior art, a viewing path was maintained by either exposing only a portion of the viewing window to the impingement of interfering matter at a given time or by cleaning and/or replacing the viewing window at intervals of time. By employing the apparatus of the present invention, the limitations and inconveniences characteristic of the prior art techniques as set forth supra are eliminated.

Accordingly, it is a primary object of this invention to provide apparatus for maintaining viewing windows substantially transparent.

More particularly, it is an object of this invention to provide apparatus adapted to prevent the collection of impinging interfering matter on viewing windows.

A further object of this invention is to provide a viewing window assembly adaptable to vacuum furnaces which is not susceptible to becoming marred or impervious to light from interfering matter impinging thereon.

Other objects and features of advantage will be apparent in the following description and accompanying drawing in which the construction and operation of the viewing window shield are set forth;

FIGURE 1 illustrates the viewing window shield assembly.

FIGURE 2 illustrates a cross section of the top view of a preferred embodiment of the viewing window shield assembly adapted to protect the viewing window of a vacuum furnace.

FIGURE 3 illustrates a front view of the preferred embodiment of the vacuum furnace viewing window with the front surface of the viewing window enclosure removed.

With the purpose of meeting the above objectives, the apparatus of the present invention comprises a transparent, transportably mounted sheet disposed with a portion thereof in shadow relation to a viewing window. A transport means is adapted to move the sheet across at least a portion of the window at an average rate greater than the rate at which impinging interfering matter collecting on the portion of the sheet which is in shadow alignment with the viewing window causes the light path to become impervious to infra-red, visible or ultra-violet radiation.

Referring now to FIGURE 1, a viewing path is to be maintained through viewing window 11. A transparent sheet 12 is disposed to be transported in planar alignment across at least a portion of the viewing surface of window 11 which is to be shielded from undesirable foreign matter impringing thereon. The transparent sheet 12 to be transported across window 11 is stored in a sheet storage container 13. Sheet 12 stored in container 13 is transported across window 11 in planar alignment therewith by a transport means 14. Hence, that portion of window 11 which is covered by sheet 12 transported thereover is protected from impingement of interfering matter thereon. Therefore, by transporting the light transparent sheet 12 across window 11 at a rate greater than the rate at which interfering matter collecting on the portion of sheet 12 which is in planar alignment with the viewing window 11 causes the viewing path to become impervious to light, light transparent path can be maintained through both window 11 and the transparent sheet 12 transported thereacross. The necessary rate of transport of sheet 12 can be determined easily, for example, by simply keeping sheet 12 stationary and observing the time it takes to become impervious to light. The transit time for similar area of sheet to traverse the light impervious exposed area is then made less than the time required to produce the light impervious surface.

A suitable storage container 13 is provided for example, by a sheet container spool disposed on one side of viewing window 11 with sheet 12 spirally wound about a spindle 16 of the spool. In those cases where it is necessary to shield from impinging interfering matter that portion of sheet 12 stored in spool 13, spool 13 would be provided with a slotted jacket 17 to enclose sheet 12 within spool 13. Transport means 14 may take the form of a rotatably mounted collector spool disposed on the side of window 11 distal storage spool 13. Sheet 12 is coupled to the spindle 18 of collector spool 14 by any suitable means, e.g., a slot in said spindle and a tongue on said sheet. As the collector spool 14 is rotated, either manually or by motor, sheet 12 is caused to be withdrawn from storage spool 13 and directed across viewing window 11 in planar alignment thereto as described previously, and to be spirally collected onto spindle 18 of collector spool 14.

Referring now to FIGURE 2, a preferred embodiment of the present invention as employed to protect viewing windows of vacuum furnaces includes a vacuum furnace housing 19, which has a port 21 to provide an opening for viewing the furnace interior. An enclosure 22, having at least two opposite sides each defining one of axially aligned apertures 23 and 24, is hermetically mounted to furnace housing 19 with enclosure apertures 23 and 24 axially aligned with port 21. Viewing window 11 is mounted within enclosure 22 spaced apart from furnace housing 19 in the optical path between apertures 23 and 24. Preferably, window 11 is an optical eyepiece pervious to visible light hermetically mounted within aperture 23 of enclosure 22 to project therein to terminate proximate aperture 24. To insure that the transparent sheet 12 can move freely between eyepiece 11 and furnace housing 19, the eyepiece 11 must be positioned so that the space between it and housing 19 is somewhat larger than the thickness of sheet 12.

Sheet 12, which is preferably in the form of a tape having a width somewhat greater than the coextending dimension of eyepiece 11 (e.g. where eyepiece 11 is circular, its diameter), stored in the tape storage container, i.e., spool 13. However, it should be noted that an equally good viewing window shield can be obtained by passing sheet 12 close, i.e., less than 1 mil, to port 21 and selecting the width of sheet 12 to be equal to or greater than the coextending dimension of port 21. Spool 13 is rotatably mounted within enclosure 22 at one side of eyepiece 11 with the spool's spindle in a plane parallel to the viewing surface of eyepiece 11. Tape 12 is passed between eyepiece 11 and port 21 to cover the objective surface of eyepiece 11 facing port 21 thereby preventing the foreign matter, such as metallic molecules, originating in the interior of the furnace from impinging on the surface of eyepiece 11. One end of tape 12 is coupled to tape transport means or collector spool 14 which is rotatably mounted within enclosure 22 at the side of eyepiece 11 distal storage spool 13 with the spool's spindle in parallel relation to the viewing surface of eyepiece 11.

Referring now to FIGURE 3, cylindrical driving member or rod 26 is mechanically coupled in rotatable driving relation to the end of collector spool 14. Rod 26 penetrates the wall of enclosure 22 in sealed, rotatable relation. The portion of rod 26 protruding outside enclosure 22 provides a means, external to enclosure 22, to cause rotation of members 26 and 14. Tape 12 is spirally wound about the spindle of storage spool 13, is passed between eyepiece 11 and port 21 as previously described, and is coupled to collector spool 14 in such a manner that rotation of spool 14 causes tape 12 to spirally unwind from storage spool 13, pass between eyepiece 11 and port 21, and be spirally collected on spool 14.

Tape 12 is selected from a class of materials which are transparent at least in thin sheets and, in the cases of vacuum furnace applications, are substantially unaffected by the environmental characteristics of vacuum furnaces where temperatures as high as 400–500° F. may be encountered at the sheet surface. One suitable type of such material is mylar, a sheet of which 1 mil in thickness is used in the preferred embodiment of this invention. Mylar is a polyethylene terephthalate resin.

In operation, the hermetic seal relations between housing 19, enclosure 22 and eyepiece 11 insure that the vacuum environment of the furnace will be maintained. Vapor particles, such as metallic molecules or the like, which enter port 21 impinge on the surface of tape 12 and thereby substantially are prevented from impinging on the viewing surface of eyepiece 11. Where tape 12 is directed to pass in close proximity to port 21, the vapor particles will also be stopped from entering enclosure 22. As vapor particles condense on the surface of tape 12 causing increased opacity of the viewing path, member 26 and hence collector spool 14 are rotated such that tape 12 is moved at a rate sufficient to maintain at least a visible light transparent viewing path. Member 26 may be manually turned or, for example, if the rate of condensation or adhesion to the surface of tape 12 is rapid, a motor may be used to drive member 26.

While the present invention has been herein described with particular respect to a single preferred embodiment, it will be apparent that numerous modifications and variations are possible within the spirit and scope of the invention. For example, although the invention is described particularly in relation to a vacuum furnace, it is readily adaptable to be employed in other applications where it is desirable to separate the environment of the viewing point from the environment of the object or system being viewed while preserving a clear light path therebetween. Also, the description of the preferred embodiment of the viewing window assembly sets forth an enclosure for the assembly and hermetically sealed viewing path. However, in many applications, e.g., in furnaces, such enclosures for and hermetic sealing of the viewing path would not be required.

Further, the transparent protective sheet is particularly described as being of plastic and more particularly of mylar plastic. However, it is also possible to use transparent sheets of other materials, such as cellulose, glass or even metal, which are substantially non porous and transparent at least in thin sheets to the complete range of electromagnetic radiation or a particular wavelength band.

The present invention is described particularly in terms of maintaining a visual viewing path through the window and using a protection sheet which is substantially transparent to a visual viewing path. Variations of this invention might be used in other type applications such as where a viewing path is necessary for the transmission of infrared light, as in the monitoring of temperature through a viewing window by infrared sensors, or ultraviolet light.

Still further, the transport means is described as two spools upon which the transparent sheet is either stored or collected. It would also be possible with less convenience to use as a transport means a simple pull mechanism which would move the transparent sheet past the viewing window. In addition, both the storage and collector spools could be motor driven whereby the sheet could be directed across the viewing window in both directions, i.e., from the storage to the collector spool, and from the collector spool back to the storage spool. Furthermore, where the impinging interfering matter is easily removed from the sheet by, for example, wiping, the sheet collecting apparatus of the window assembly could be adapted with a wiping means to clean the sheet as it is being collected.

Thus, the foregoing description is not intended to limit the invention except by the terms of the following claims.

What is claimed is:

1. A viewing window assembly for use in combination with vacuum furnaces operable at high temperatures, comprising:

(a) a viewing window hermetically coupled in planar alignment to an apertured outer wall of a vacuum furnace to provide a transparent viewing path for viewing the interior of the furnace from a point outside said furnace, (b) a transparent tape of polyethylene terephthalate resin disposed between and in planar relation with said viewing window and said aperture defined by said vacuum furnace wall thereby preventing matter from the interior of the furnace from impinging on at least a part of said window and maintaining the transparency of the viewing path in the presence of high temperatures, (c) transport means to move said tape along a path transverse to the viewing surface of said window at a rate greater than the rate at which impinging interfering matter collecting on said tape causes the viewing path through said tape and said window to become impervious to light.

2. A viewing window assembly for use in combination with vacuum furnaces, comprising:
(a) an apertured enclosure adapted to be hermetically joined to an apertured outer wall of a vacuum furnace to have its aperture aligned with the aperture defined by said vacuum furnace wall thereby providing an optical viewing path for viewing the interior of the furnace from a point outside said enclosure,
(b) a visible light pervious viewing window disposed in said optical viewing path in planar alignment with and in spaced relation to said furnace wall aperture, said window hermetically disposed to seal said enclosure aperture and thereby provide a gas tight optical viewing path into said furnace,
(c) an elongated tape of visible light transparent material, said tape having a width greater than the width of said furnace wall aperture,
(d) a tape storage container disposed at one side of said viewing window, said elongated tape disposed in withdrawable relation therein, and
(e) a tape transport means disposed at the side of said viewing window distal said storage container, said transport means coupled to said tape and adapted to withdraw said tape from said container along a path transverse to the optical viewing path adjacent to the surface of said window facing said furnace wall aperture, said tape withdrawn from said storage container to pass said viewing window in planar alignment with said surface facing said furnace wall aperture at a rate greater than the rate at which impinging interfering mattter from within said furnace collecting on said tape causes the viewing path through said tape and said window to become opaque.

3. The apparatus of claim 2 further defined by
(a) said tape storage container being a storage spool rotatably mounted within said enclosure, said tape being spirally wound about the spindle of said spool,
(b) said transport means including a collector spool rotatably mounted within said enclosure to receive said tape from said storage spool, and
(c) a driving member coupled to said collector spool to rotate said spool hermetically and rotatably penetrating said enclosure to the exterior thereof.

4. The apparatus of claim 3 further defined by said driving member adapted to be coupled to a motor drive.

5. The apparatus of claim 2 further defined by said tape material being polyethylene terephthalate resin.

6. A viewing window assembly for providing in the presence of impinging interfering matter a clear transparent path therethrough, comprising an assembly including a window providing a viewing path therethrough, a tape storage container disposed at one side of said viewing window, an elongated tape disposed in withdrawable relation within said storage container, and a tape transport means disposed at the side of said viewing window distal said storage container, said transport means coupled to said tape and adapted to withdraw said tape from said container along a path transverse to the optical viewing path adjacent to a surface of said window impinged upon by said interfering matter, said transport means adapted to withdraw said tape from said storage container to pass said viewing window in planar alignment with and in close proximity to said surface.

7. Apparatus as defined in claim 6, wherein said transport means is adapted to move said tape past said viewing window surface at a rate greater than the rate at which impinging interfering matter causes the viewing path through said window and said tape to become opaque.

References Cited by the Examiner
UNITED STATES PATENTS

| 1,237,045 | 8/1917 | Houren | 20—40.56 |
| 1,604,811 | 10/1926 | Curry et al. | 126—200 |
| 2,298,063 | 10/1942 | MacPherson | 20—40.56 |

FOREIGN PATENTS

| 967,353 | 8/1964 | Great Britain. |

KENNETH W. SPRAGUE, *Primary Examiner.*